United States Patent [19]

Fontenot

[11] Patent Number: 5,193,842
[45] Date of Patent: Mar. 16, 1993

[54] COMBINED GOLF BAG AND COOLER CART

[76] Inventor: Joel K. Fontenot, 3129 San Fernando NW., Albuquerque, N. Mex. 87104

[21] Appl. No.: 853,220

[22] Filed: Mar. 18, 1992

[51] Int. Cl.⁵ .............................................. B62B 1/12
[52] U.S. Cl. ..................................... 280/645; 280/654; 280/655; 280/47.19; 280/47.26; 280/DIG. 6; D34/15
[58] Field of Search .................. 280/DIG. 5, DIG. 6, 280/652, 654, 655, 655.1, 47.315, 47.26, 47.27, 47.33, 645, 47.18, 47.19; 224/274; D34/15

[56] References Cited

U.S. PATENT DOCUMENTS

| D. 179,126 | 11/1956 | Eging | 280/DIG. 6 X |
|---|---|---|---|
| D. 292,039 | 9/1987 | Moore | D34/15 |
| D. 300,577 | 4/1989 | Pope et al. | D34/15 |
| 1,960,862 | 5/1934 | Baldwin | 280/DIG. 6 X |
| 2,449,910 | 9/1948 | Quiring | 280/DIG. 6 X |
| 2,687,894 | 8/1954 | Stoddard | 280/DIG. 6 X |
| 2,687,895 | 8/1954 | Rutledge | 280/DIG. 6 X |
| 3,023,020 | 2/1962 | Hasty | 280/654 |
| 3,131,842 | 5/1964 | Dingle, Jr. et al. | 224/29 |
| 3,735,997 | 5/1973 | Seibold et al. | 280/DIG. 6 X |
| 3,844,459 | 10/1974 | Chambers | 224/55 X |
| 4,550,930 | 11/1985 | Proffit | 280/655 |
| 4,762,193 | 8/1988 | Levine | D34/15 X |
| 4,889,267 | 12/1989 | Bolton | 224/274 |
| 4,998,743 | 3/1991 | Thielen | 280/DIG. 6 X |

FOREIGN PATENT DOCUMENTS 483754  4/1938  United Kingdom ......... 280/DIG. 6

Primary Examiner—Brian Johnson
Attorney, Agent, or Firm—Henderson & Sturm

[57] ABSTRACT

A collapsible cart apparatus (10) for transporting a golf bag (100) and a cooler (150); wherein, the cart apparatus (10) comprises a pivoted framework unit (12) mounted on a wheel assembly unit (11) and having a golf bag support unit (13) and a cooler support unit (14) disposed in such a manner that the golf bag (100) overlies the cooler (150) in the operative mode of disposition of the cart apparatus (10).

4 Claims, 2 Drawing Sheets

COMBINED GOLF BAG AND COOLER CART

TECHNICAL FIELD

The present invention relates to the field of wheeled cart arrangements in general, and in particular to a collapsible cart which is designed to transport both a golf bag and a cooler.

BACKGROUND ART

This invention was the subject matter of Document Disclosure Program Registration No. 276740 which was filed in the United States Patent and Trademark Office on Mar. 18, 1991.

As can be seen by reference to the following U.S. Pat. Nos. 4,889,267; 4,550,930; 3,131,842; and 3,844,459; the prior art is replete with myriad and diverse cart arrangements which provide means for accommodating either a cooler or other beverage receptacle such as a thermos or the like.

While all of the aforementioned prior art constructions are more than adequate for the basic purpose and function for which they have been specifically designed, these prior art constructions have been limited by a number of design flaws such as: limited carrying capacity; awkward placement of the cooler relative to the golf bag; undue complexity of construction; and/or limited collapsibility of the cart for storage and transport considerations.

As a consequence of the foregoing situation, there has existed a longstanding need for a new type of cart construction that will accommodate both a golf bag and a cooler in a convenient manner; wherein, the cart construction is both collapsible and/or easily disassembled; and, the provision of such a construction is a stated objective of the present invention.

DISCLOSURE OF THE INVENTION

Briefly stated, the collapsible cart apparatus that forms the basis of the present invention comprises in general; a wheel assembly unit; a pivoted framework unit; a golf bag support unit; a cooler support unit; and an adjustable handle unit.

The golf bag support unit is disposed on the outboard and upper ends of the pivoted framework unit; and, the cooler support unit is disposed on the lower framework unit so as to be positioned beneath the golf bag at a point proximate to the axle of the wheel assembly unit; such that the contents of the cooler are not subjected to large vertical displacements as the cart traverses a golf course in the usual manner.

As will be explained in greater detail further on in the specification, not only does this arrangement place the cooler in a shaded location beneath the golf bag to increase the thermal effectiveness of the cooler; but, this placement also allows the golfer to have unimpeded access to all of the compartments in their golf bag; as well as placing the center of gravity of both the golf bag and the cooler closer to the axle of the wheel assembly unit to enhance the stability of the loaded cart.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
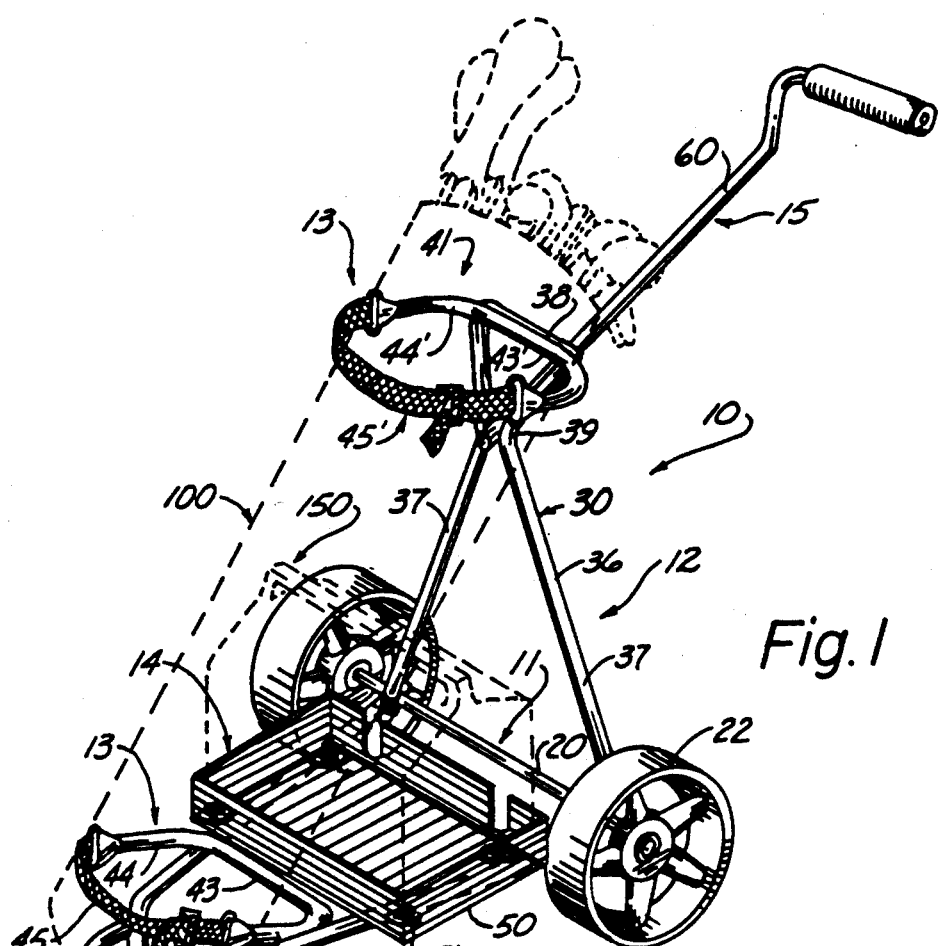
FIG. 1 is a perspective view of the cart apparatus that forms the basis of the present invention.

As can be seen by reference to the drawings, and in particular to FIG. 1, the car apparatus that forms the basis of the present invention is designated generally by the reference numeral (10). The apparatus (10) comprises in general: a wheel assembly unit (11) a pivoted framework unit (12); a golf bag support unit (13); a cooler support unit (14) and an adjustable handle unit (15). These units will now be described in seriatim fashion.

Figure 3:
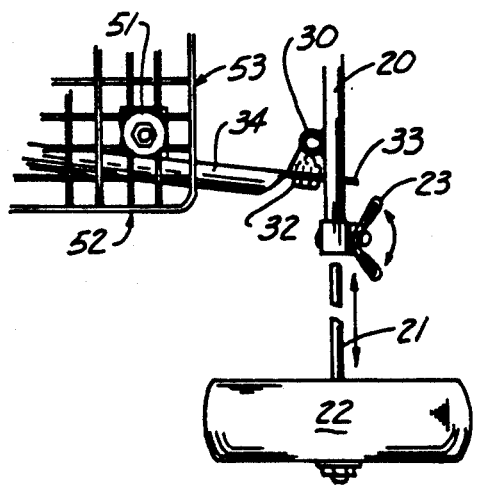
FIG. 3 is an isolated detail view of one side of the wheel assembly unit.
Figure 6:
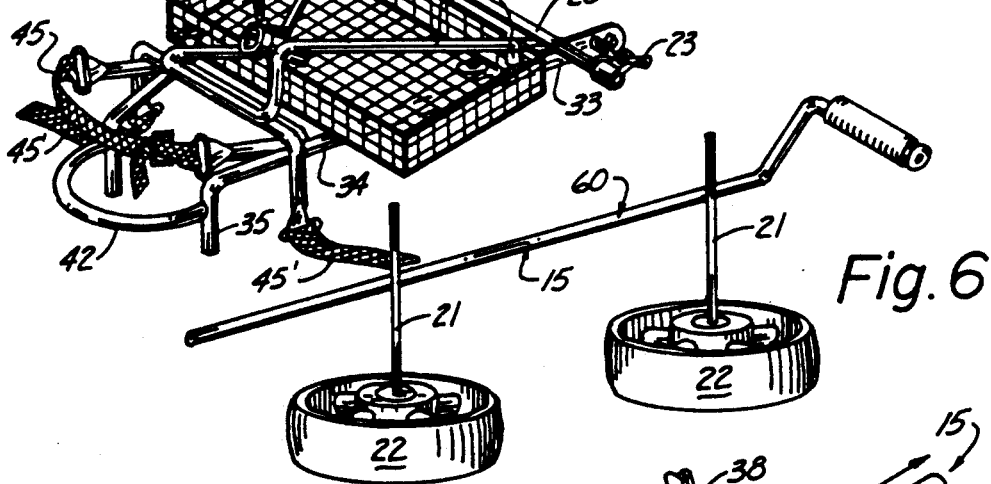
FIG. 6 is a perspective view of the apparatus in its collapsed, disassembled mode; and, FIG. 7 is an isolated perspective view of the adjustable handle unit.
Figure 7:
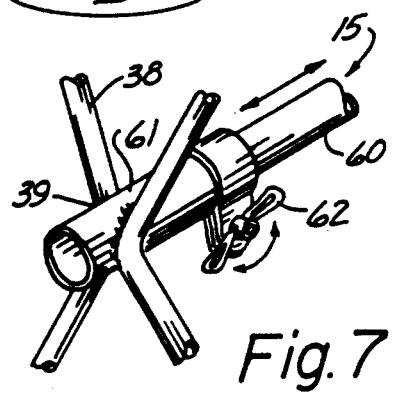

As can best be seen by reference to FIGS. 1, 3 and 6, the wheel assembly unit (11) comprises in general an elongated hollow tubular main axle member (20) dimensioned to receive a pair of axle stubs (21); each of which rotatably support a wheel member (22) in a well recognized fashion.

In addition each end of the main axle member (20) is provided with a locking mechanism 23 for releasably securing the axle stubs (21) within the main axle member (20).

Turning now to FIGS. 1, through 6 it can be seen that the pivoted framework unit (12) comprises an upper (30) and a lower (31) tubular framework members pivotally connected together as at (32); wherein, the inboard ends of the lower framework member (31) are provided with an upwardly angled bracket (33) which is dimensioned to receive the main axle member as shown in FIGS. 2 through 5.

Figure 2:
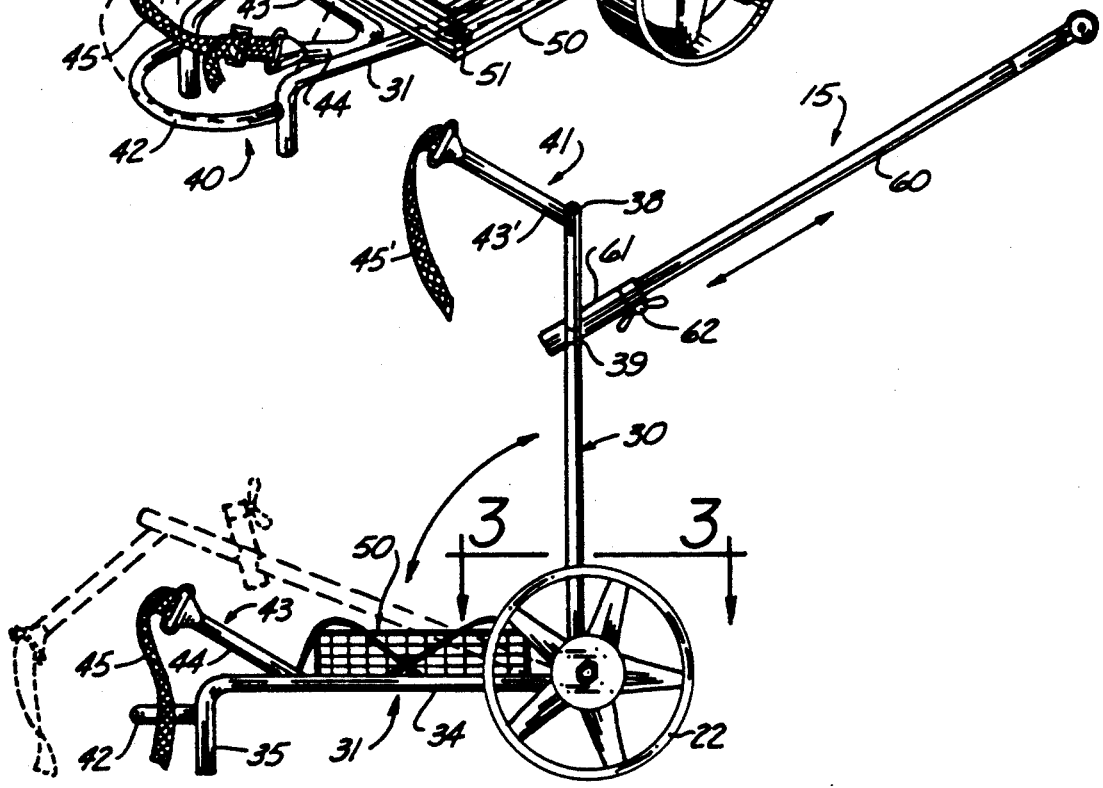
FIG. 2 is a side elevation view of the cart apparatus.

As can best be seen by reference to FIGS. 1, 2 and 6, the lower framework member (31) comprises a pair of generally L-shaped tubular leg elements (34); wherein, the foot portion (35) of each leg element (34) is dimensioned to align the lower framework member (31) in a horizontal plane disposed generally parallel to the ground.

Turning in particular to FIGS. 1 and 6, it can be seen that the upper framework member (30) comprises a single contoured tubular element (36) having two downwardly and outwardly depending arms (37) which are pivotally secured on their lower ends, to the lower framework member (31); wherein the upper portion of the upper framework member (30) is formed into a partially closed loop (38) having a restricted neck portion (39).

As shown in FIGS. 1, 2, and 6, the golf bag support unit (13) comprises a lower bag support member (40) and an upper bag support member (41). The lower bag support member (40) comprises a horizontally disposed generally C-shaped tubular shelf element (42), whose ends are joined to the outboard end of the lower framework member (31) to join the tubular leg elements (34) together; and an upwardly angled generally U-shaped lower capture element (43) whose intermediate portion is affixed to the top of the leg elements (34) of the lower framework member (31).

In addition, the arms (44) of the lower capture element (43) are dimensioned to receive and partially encircle the lower sides of a golf bag (100) depicted in phantom; and, the arms (44) of the lower capture element (43) are further provided with straps (45) for captively securing the lower portion of the golf bag (100) within the lower capture element (43), in a well recognized fashion.

Still referring to FIGS. 1, 2 and 6, it can be seen that the upper bag support member (41) comprises an upwardly angled generally U-shaped upper capture element (43') whose intermediate position is affixed to the top of the upper framework member (30).

In addition the arms (44') of the upper capture element (43') are dimensioned to receive and partially encircle the upper sides of the golf bag (100); and, the arms (44) of the upper capture element (43') are further provided with straps (45') for captively securing the upper portion of the golf bag (100) to the upper capture element (43') in a well recognized fashion.

Figure 4:
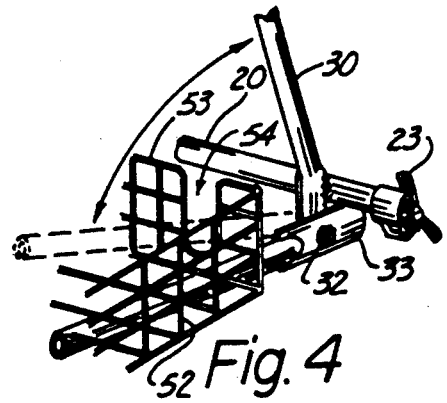
FIG. 4 is an isolated perspective view of the cooperation between the framework unit and the cooler support unit.
Figure 5:
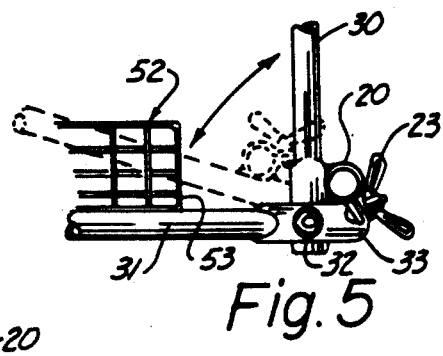
FIG. 5 is a side elevation view of the arrangement depicted in FIG. 4.

As shown in FIGS. 1 through 5, the cooler support unit (14) comprises a generally rectangular mesh tray member (50) which is fastened on top of the lower framework member (31) by suitable fastening members (51). In addition the tray member (50) is provided with raised walls (52) to prevent the cooler from sliding off of the tray member (50); wherein, the rear wall (53) of the tray member (50) is provided with slots (54) that are dimensioned to receive the arms (37) of the upper framework member (30) when the upper framework member (30) is folded downwardly onto the lower framework member (31), as shown in FIGS. 4 through 6.

As can best be seen by reference to FIGS. 1, 2, 6 and 7, the adjustable handle unit (15) comprises an elongated handle member (60) dimensioned to be slideably received in a cylindrical socket element (61) provided with a suitable fastening mechanism (62) adapted to captively engage the handle member (60) at a desired location within the socket element (61). In addition, the socket element (61) is secured in an upwardly and rearwardly angled direction at the neck (39) of the upper framework member (30); wherein, the effective length of the handle member (60) relative to the upper framework member (30) may be varied to suit the particular needs of the user.

By now it should also be appreciated that the apparatus (10) that forms the basis of the present invention, provides a safe, reliable and stable means for transporting a cooler in conjunction with a golf cart; and, this apparatus (10) is designed to be either collapsed or disassembled into a very compact unit for the purposes of transportation and/or storage.

I claim:

1. A collapsible cart apparatus for carrying both a golf bag and a cooler; wherein, the cart apparatus comprises:

a wheel assembly unit including an elongated main axle member a pivoted frameword unit including: a lower framework member operatively connected to said main axle member; and, an upper framework member pivotally attached to the lower framework member;

a golf bag support unit including: a horizontally disposed shelf element provided on the lower framework member; and, at least one capture element mounted to said framework unit, and having arms that are dimensioned to partially surround the golf bag; and, a cooler support unit including: a tray member attached to the lower framework member at a point intermediate said shelf element and the operative connection between the lower framework member and the main axle member; wherein, said tray member has raised walls including a rear wall and the rear wall of the tray member is provided with at least one slot for receiving a portion of the upper framework member when the upper framework member is pivoted downwardly relative to the lower framework member.

2. The cart apparatus as in claim 1; wherein, said golf bag support unit comprises a pair of upwardly angled capture elements; wherein, one of the capture elements is attached to the lower framework member and the other capture element is attached to the upper framework member; and, both of the capture elements have arms that are dimensioned to partially surround the golf bag.

3. The cart apparatus as in claim 2; wherein, the arms of the capture elements include straps connected to, and that cooperate with, said arms to captively encircle spaced portions of the golf bag.

4. The cart apparatus as in claim 1; further comprising an adjustable handle unit operatively associated with the upper framework member and including a generally cylindrical socket element attached to the upper framework member and dimensioned to receive an elongated handle member; wherein, the socket element is further provided with a fastening mechanism which will captively engage the handle member at a selected position relative to the socket element.

* * * * *